(12) United States Patent
Breuer et al.

(10) Patent No.: US 8,286,914 B2
(45) Date of Patent: Oct. 16, 2012

(54) CONVEYOR DEVICE FOR AIRPLANES

(75) Inventors: Matthias Breuer, Hamburg (DE); Michael Mosler, Plaisance du Touch (FR)

(73) Assignee: Airbus Operation GmbH, Hamburg (DE)

( * ) Notice: Subject to any disclaimer, the term of this patent is extended or adjusted under 35 U.S.C. 154(b) by 230 days.

(21) Appl. No.: 12/723,386

(22) Filed: Mar. 12, 2010

(65) Prior Publication Data

US 2010/0230536 A1 Sep. 16, 2010

Related U.S. Application Data

(60) Provisional application No. 61/159,847, filed on Mar. 13, 2009.

(30) Foreign Application Priority Data

Mar. 13, 2009 (DE) .......................... 10 2009 012 998

(51) Int. Cl.
*B64D 11/00* (2006.01)
*B64D 11/04* (2006.01)

(52) U.S. Cl. ................................... 244/118.5

(58) Field of Classification Search ............... 244/118.1, 244/118.5, 137.1, 173.1, 173.3; 186/40, 186/47, 51; 105/327
See application file for complete search history.

(56) References Cited

U.S. PATENT DOCUMENTS

| | | | | |
|---|---|---|---|---|
| 3,179,208 A * | 4/1965 | Umanoff | | 186/40 |
| 4,318,328 A * | 3/1982 | Rona | | 89/1.815 |
| 5,496,000 A | 3/1996 | Mueller | | |
| 6,286,783 B1 * | 9/2001 | Kuenkler | | 244/30 |
| 7,252,267 B2 * | 8/2007 | Young et al. | | 244/118.5 |
| 2007/0284481 A1 | 12/2007 | Linero | | |
| 2008/0128248 A1 | 6/2008 | Hoffjann et al. | | |

FOREIGN PATENT DOCUMENTS

| | | |
|---|---|---|
| DE | 4029628 C1 | 10/1991 |
| DE | 10204892 A1 | 8/2003 |
| WO | 2005066022 A2 | 7/2005 |

* cited by examiner

*Primary Examiner* — Tien Dinh
*Assistant Examiner* — Richard R Green
(74) *Attorney, Agent, or Firm* — Ingrassia Fisher & Lorenz P.C.

(57) ABSTRACT

A conveyor device is provided for airplane for storing and conveying objects in an arc-shaped shaft. The shaft surrounds an area of a payload space of the airplane. An airplane is also provided with such a conveyor device.

17 Claims, 2 Drawing Sheets

12 # CONVEYOR DEVICE FOR AIRPLANES

CROSS-REFERENCE TO RELATED APPLICATIONS

This application claims the benefit of the filing date of German Patent Application No. 102009012998.7 filed Mar. 13, 2009 and of U.S. Provisional Patent Application No. 61/159,847 filed Mar. 13, 2009, the entire disclosure of which application is hereby incorporated herein by reference.

TECHNICAL FIELD

The invention relates to a conveyor device for airplanes for storing and conveying objects.

BACKGROUND

Known from DE 102 04 892 A1 is a conveyor device for the vertical transport of catering containers in commercial airliners. However, the disadvantage to such conveyor devices is that they occupy a relatively large amount of payload space, which is hence no longer available for conveying passengers and/or freight.

SUMMARY

The embodiments of the invention may provide an alternative conveyor device for airplanes with which the aforementioned disadvantage can at least be partially eliminated.

An exemplary embodiment of the invention relates to a conveyor device for airplanes for storing and conveying objects in an arc-shaped shaft, wherein the shaft surrounds an area of a payload space in the airplane. The term "surrounds" must here be not be construed as to necessarily presuppose a closed arc. The payload space is preferably a passenger compartment or cargo compartment. An advantage of this exemplary embodiment may be that more efficient use is made of the payload space, since the conveyor device does not completely occupy the airplane fuselage section in which the conveyor device is located, leaving payload space in the center of the conveyor device. Another advantage to this conveyor device may be that it does not have to be arranged centrally in the airplane interior, and hence does not pose an obstacle to passengers boarding or exiting the airplane, thereby also being less disruptive to passenger catering and operations performed during ground times. As a result, passenger catering can take place more quickly, and the airplane ground times between flights can be shortened. In addition, such a conveyor device may eliminate the need for placing the catering containers in catering carts ("trolleys") in the vicinity of the galley as had previously been the case, and may make it possible to store them in another way, and convey them to the galley as required. The number of necessary catering carts may be reduced as a result, since the catering carts are only still required for distributing food, and do not have to be provided in the galley area for holding the catering containers. The reduced number of catering carts may also enable a decrease in the number of onboard kitchens ("galleys"), resulting in a major savings in space, which in turn permits a higher number of seats. In addition, this conveyor device may offer the advantage that it enables completely new cabin concepts and cabin configurations, since the conveyor device now envelops a portion of the passenger cabin. This may economize on space in the lower deck cargo hold, which can be used for other purposes.

Another exemplary embodiment of the invention provides a conveyor device in which the shaft is annular. This may provide a transport system set up according to the "cylindrical drum principle" by means of which cargo units (e.g., "standard units"), luggage items or passenger catering are quickly accessible, since there are always two opportunities to retrieve a specific object given an annular shaft, i.e., the conveyor device is operated in such a way that the object moves toward the target position either clockwise or counter-clockwise. As a result, the conveyor device may be made to move in the direction in which the object can be reached more quickly.

In another exemplary embodiment of the invention, the conveyor device may be set up in such a way as to be arranged adjacent or in proximity to a fuselage hull of the airplane. This yields the advantage of significantly increasing the amount of payload space, since it becomes possible to shift the galley toward the outer skin of the airplane. Further, the advantage to this may be that the conveyor device helps to increase the stiffness of the airplane structure.

In another exemplary embodiment of the invention, the conveyor device is set up in such a way that the shaft can be accessed from the outside of the airplane. This may yield the advantage of providing the loading personnel with an ergonomic working environment, since they no longer have to enter into the cargo bay, but can rather stand in an upright working position and load objects comfortably into the conveyor device from outside. Further, it is possible for the passengers themselves to load their baggage into the conveyor device or set it down in front of the access opening before getting into the airplane, so that the luggage remains with the passenger until he or she enters the airplane, thereby precluding any loss of luggage. In addition, the conveyor device according to the invention makes it possible to even forego an external luggage conveyor at the airplane entirely, which again results in cost savings for the airport operator, and hence in lower airport fees.

In another exemplary embodiment of the invention, the conveyor device is set up in such a way that the shaft is accessible from the payload area. As a result, catering containers loaded from outside may be comfortably transported to the galleys in the airplane and there removed.

In another exemplary embodiment of the invention, the conveyor device is set up in such a way as to exhibit an oven function for heating objects located in the shaft. As a result, the galleys may be made smaller, since the catering items for the passengers can already been heated while being transported to the access openings. In addition, passenger catering may be improved, since the catering containers need not be heated in a separate step, but rather can be directly removed and served hot.

In another exemplary embodiment of the invention, the conveyor device is set up in such a way as to exhibit a cooling function for cooling the objects located in the shaft. As a result, for example, foodstuffs to be kept fresh or refrigerated or beverages may be stored accordingly or cooled while transported to the access opening.

Further, the invention provides an airplane with a conveyor device according to one of the preceding exemplary embodiments. This airplane may offer the advantage of enabling completely novel cabin concepts and cabin configurations, which permit a better use of payload space.

The payload space is here most advantageously a passenger compartment of the airplane.

Another exemplary embodiment of the invention provides an airplane in which the shaft is provided with an access opening above a floor element of the airplane, through which the shaft may be accessed from the payload area. This may make it possible to use the conveyor device for storing foods and removing these foods in the area of the galleys.

Another exemplary embodiment of the invention provides an airplane in which the shaft is provided with an access opening below a floor element of the airplane, through which the shaft can be accessed from the outside of the airplane. This enables a practical loading from outside.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
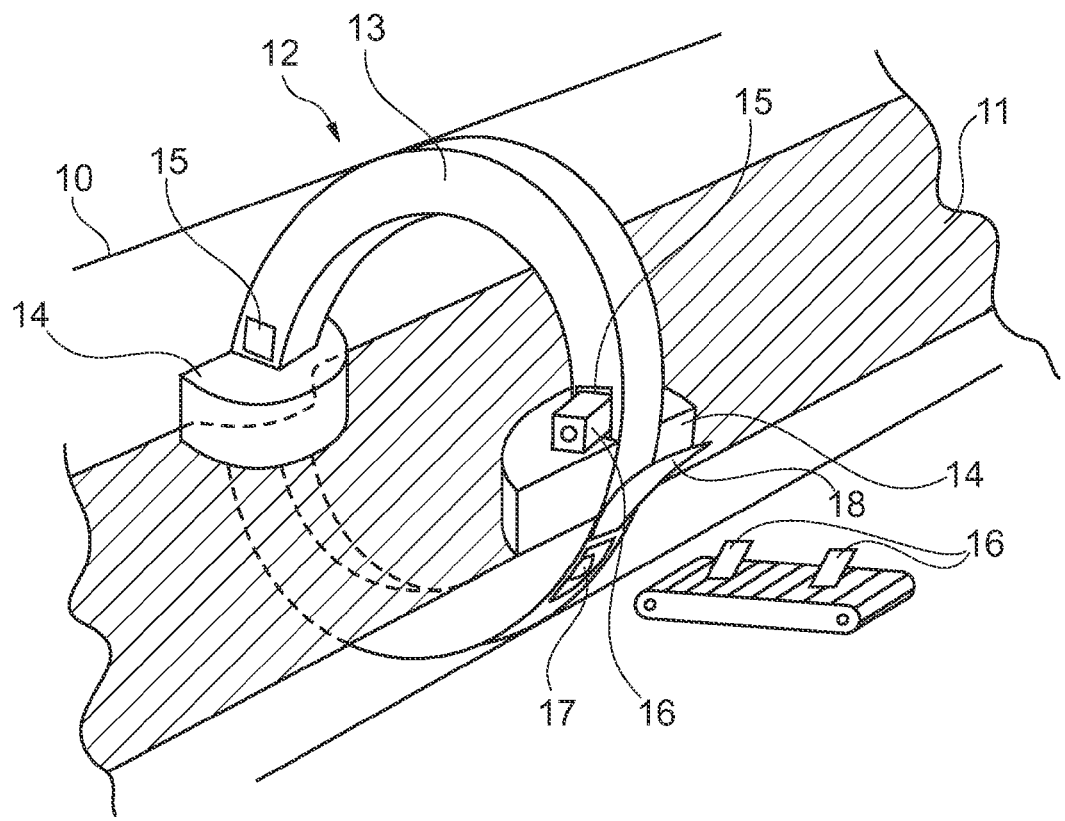
FIG. 1 shows a conveyor device according to an exemplary embodiment of the invention.

FIG. 1 shows the conveyor device 12 according to an exemplary embodiment of the invention. Visible in the cross sectional view of an airplane fuselage 10 at roughly half the height is a floor element 11, which can function as a passenger compartment floor or cargo hold floor. The conveyor device 12 exhibits an annular element 13 with a quadratic or rectangular cross section consisting of a material like aluminum or carbon fiber. In a plane transverse to the longitudinal direction of the airplane, the outer periphery of the annular element 13 essentially corresponds to the transverse form of the airplane fuselage 10. The annular element 13 is hollow inside, and hence comprises a shaft. The side of the annular element 13 facing to the outside is here preferably flanged directly to the structure of the outer skin of the airplane fuselage 10, or arranged adjacent to the outer skin of the airplane fuselage 10. Even though FIG. 1 shows an annular conveyor device. Even though FIG. 1 depicts an annular conveyor device that exhibits a closed, continuous shaft, it is also possible to provide a conveyor device 12 with a shaft comprising only a half a ring. As a result, the annular element 13 is arc-shaped, and extends for a certain distance in the circumferential direction along the inside of the outer skin of the airplane fuselage 10. The conveyor device 12 hence exhibits a shaft that is arranged between the passenger cabin and/or the cargo hold of the airplane and the outer hull of the airplane, and runs like an arc around the passenger compartment or cargo hold of the airplane. A galley 14 that envelops the annular element 13 is arranged on the floor element 11. For example, the side of the galley 14 facing the middle of the airplane fuselage 10 is semicircular, and the height of the galleys is roughly hip-high. Provided above an upper surface of the galleys 14 are access openings 15 through which objects 16 can be loaded into the shaft or removed from the latter. The access openings 15 are situated directly over the galleys 14 and dimensioned in such a way that the objects to be loaded can fit through. Provided in the area below the floor element 11 is an access opening 17, through which objects 16 can be loaded into the shaft or removed from the latter. The access opening 17 is here accessible from the outside of the airplane. The access opening 17 can be closed off by means of a cargo hold door 18. If needed, a conveyor belt can be provided for purposes of loading via the access opening 17.

Figure 2:
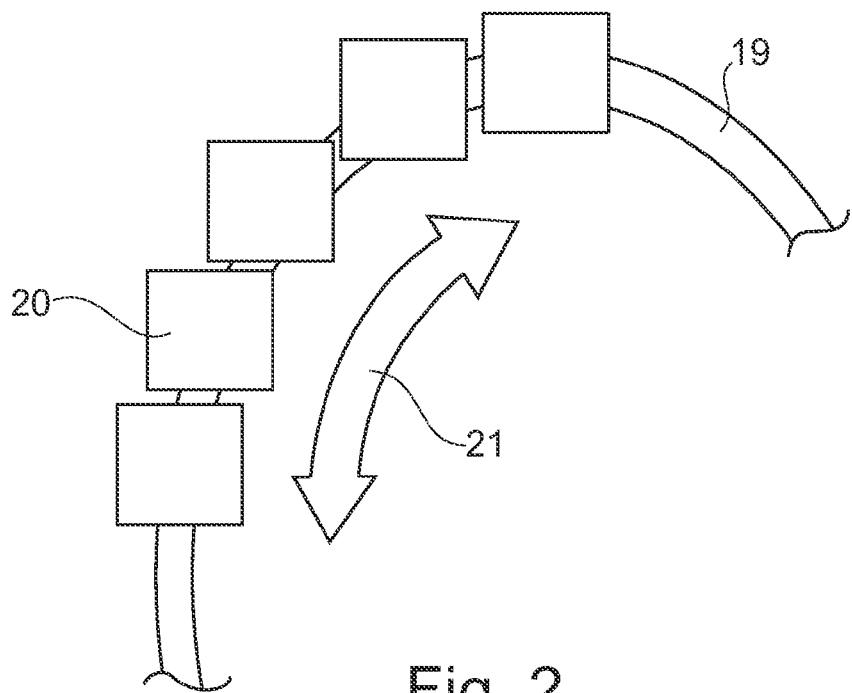
FIG. 2 shows a diagrammatic view of the operating principle behind the conveyor device according to an exemplary embodiment of the invention in a sectional view transverse to the longitudinal direction of the airplane.

FIG. 2 provides a diagrammatic view of how the conveyor device 12 functions in a cross sectional view transverse to the longitudinal direction of the airplane. For example, the objects 16 in the shaft can be secured by attachment means to a chain or belt that describe an essentially oval conveying path 19. As an alternative to the above, loading compartments 20 can be provided that are secured to the belt or chain, and hence describe the prescribed, essentially oval circular path chained together within the shaft. These prescribed loading compartments 20 can then be loaded with the objects 16 to be loaded. The conveyor device 12 can move both counterclockwise and clockwise within the shaft, as denoted by arrow 21.

The conveyor device 12 can further be equipped with an oven function. What this means is that a controller can coordinate the heating of specific objects 16 or loading compartments 20 or the contents of the loading compartments 20. In this case, the controller can be informed in advance about which position which objects 16 are in, or the latter are automatically detected by sensors, so that the controller stores the position to which specific objects 16 are allocated at any time. In this way, the user can determine in advance which objects 16 are to be heated and which ones are not. At a specific section of the conveyor device 12, the oven function is realized using a correspondingly provided heating function.

Accordingly, a cooling function can be provided, which instead of a heating function exhibits a refrigerating machine, which affects a thermodynamic circulation process in order to cool specific objects 16 or loading compartments 20 or the contents of the loading compartments 20. Alternatively or additionally to the refrigerating machine, the cold ambient temperature can be used during flight by heat exchangers to guide coldness into the shaft, or introduce cold air into the shaft.

Figure 3A:
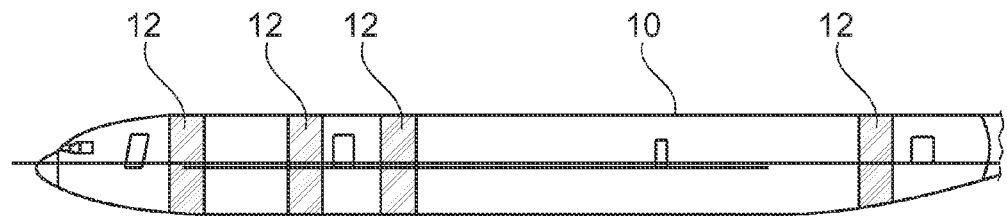
FIG. 3a shows preferred configurations of the conveyor device according to an exemplary embodiment of the invention in a side view of the airplane.
Figure 3B:
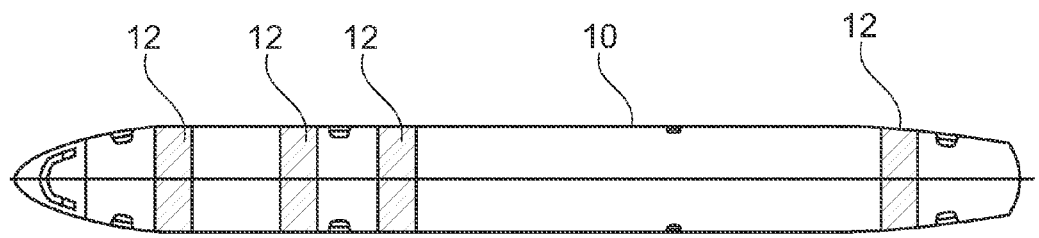
FIG. 3b shows preferred configurations of the conveyor device according to an exemplary embodiment of the invention in a top view of the airplane.

FIGS. 3a and 3b show preferred positions for arranging the conveyor device 12 according to an exemplary embodiment of the invention in a side view and top view of the airplane. The preferred positional arrangements are behind an access door at the very front, on either side of the second access door from the front, and in front of an access door located at the tail.

Figure 4A:
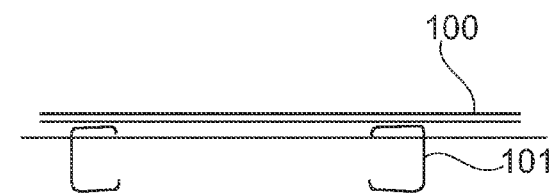
FIG. 4a shows a sectional view in the area of the outer skin in conventional airplane.
Figure 4B:
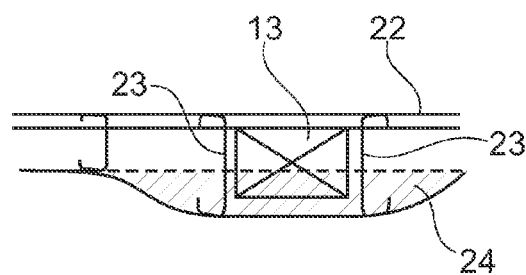
FIG. 4b shows a sectional view in the area of the outer skin according to an exemplary embodiment of the invention.

FIGS. 4a and 4b show a contrasting view of a cross section in the area of the outer skin for a conventional airplane and for an airplane with the conveyor device 12 according to the invention. Reference number 100 denotes the outer skin of an airplane, the interior side of which accommodates frames 101. In the airplane fuselage 10 depicted on FIG. 4b, enlarged frames 23 are arranged adjacent to an outer skin 22, positioned on either side of the annular element 13, so that the shaft runs between these enlarged frames 23. The hatched surface 24 here shows the additionally required space.

In other words, a conveyor device according to the cylindrical drum principle is provided, flanged directly to the structure of the outer skin of the airplane. The annular, continuous tunnel of the conveyor system can be loaded or unloaded both from outside and from inside the cabin. The especially advantageously configured galley variant eliminates the huge amount of space required for a conventional galley, since the standard units are passed through the tunnel. As a result, the conveyor belt in the tunnel simultaneously serves as a storage area. Only two catering carts are now required for transport into the cabin to the passengers. The removal opening is followed directly by a preparation galley, the location where the meals are prepared. The especially advantageous transport system makes it possible to arrange preparation galley areas on the two lateral areas of the cabin. The conveying channel can also be provided with cooling air due to the proximity to the outer skin. In another especially advantageous embodiment, the transport channel is partially heated. As a result, the meals are already heated and ready to serve after arriving at the removal opening.

In addition, let it be noted that "comprising" and "exhibiting" do not preclude any other elements or steps, and "a" or "an" do not rule out a plurality. Let it further be noted that features that have been described with reference to one of the above further developments can also be used in combination with other features of other further developments described above. Reference numbers in the claims are not to be construed as a limitation. Furthermore, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A conveyor device for an airplane having a payload space, comprising:
   an area of the payload space; and
   an arc-shaped shaft that is arranged in a plane transverse to the longitudinal direction of the airplane between a passenger cabin or a cargo hold and the outer hull of the airplane and surrounds the area of the payload space and adapted to store and convey a catering container.

2. The conveyor device of claim 1, wherein the arc-shaped shaft is annular.

3. The conveyor device of claim 1, wherein the conveyor device is adjacent to a fuselage hull of the airplane.

4. The conveyor device of claim 1, wherein the arc-shaped shaft is accessible from an outside of the airplane.

5. The conveyor device of claim 1, wherein the arc-shaped shaft is accessible from the payload space.

6. The conveyor device of claim 1, wherein the conveyor device further comprises an oven device adapted to heat a heating object located in the arc-shaped shaft.

7. The conveyor device of claim 1, wherein the conveyor device further comprises a cooling device adapted to cool a cooling object located in the arc-shaped shaft.

8. An airplane, comprising:
   a payload space of the airplane;
   an area of the payload space; and
   an arc-shaped shaft that is arranged in a plane transverse to the longitudinal direction of the airplane between a passenger cabin or a cargo hold and the outer hull of the airplane and surrounds the area of the payload space and adapted to store and convey a catering container.

9. The airplane of claim 8, wherein the payload space is a passenger compartment of the airplane.

10. The airplane of claim 8, further comprising an access opening in the arc-shaped shaft above a floor element of the airplane through which the arc-shaped shaft can be accessed from the payload space.

11. The airplane of claim 8, wherein an access opening is provided in the arc-shaped shaft below a floor element of the airplane through which the arc-shaped shaft can be accessed from an outside of the airplane.

12. The airplane of claim 8, wherein the arc-shaped shaft is annular.

13. The airplane of claim 8, wherein the arc-shaped shaft is adjacent to a fuselage hull of the airplane.

14. The airplane of claim 8, wherein the arc-shaped shaft is accessible from an outside of the airplane.

15. The airplane of claim 8, wherein the arc-shaped shaft is accessible from the payload space.

16. The airplane of claim 8, further comprising an oven device adapted to heat a heating object located in the arc-shaped shaft.

17. The airplane of claim 8, further comprising a cooling device adapted to cool a cooling object located in the arc-shaped shaft.

* * * * *